United States Patent [19]
Hacheney

[11] Patent Number: 4,580,904
[45] Date of Patent: Apr. 8, 1986

[54] DEVICE FOR OBTAINING HIGH-QUALITY MIXTURES OF SOLIDS AND LIQUIDS EXTENDING TO THE COLLOIDAL SYSTEM OR TO COAGULATION INTENDED FOR TREATING WATER OR FOR INTRODUCING GASES INTO LIQUIDS

[76] Inventor: Wilfried Hacheney, Am Konigsberg 15, 4930 Detmold, Fed. Rep. of Germany

[21] Appl. No.: 607,353

[22] Filed: May 4, 1984

[30] Foreign Application Priority Data
Jul. 19, 1983 [DE] Fed. Rep. of Germany ....... 3325952

[51] Int. Cl.⁴ ........................... B01F 13/06; B01F 7/22
[52] U.S. Cl. .................................... 366/137; 366/139; 366/165; 366/192; 210/195.1; 210/205
[58] Field of Search ............... 366/165, 262, 264, 266, 366/150, 154, 159, 136, 137, 139, 192, 193, 292, 293; 210/195.1, 205, 219

[56] References Cited
U.S. PATENT DOCUMENTS

| | | | |
|---|---|---|---|
| 2,769,546 | 11/1956 | Fontein | 210/195.1 |
| 2,860,785 | 11/1958 | Gardner | 210/195.1 |
| 3,994,480 | 11/1976 | Forthergill | 366/165 |
| 4,133,850 | 1/1979 | Hauser | 210/219 |
| 4,140,737 | 2/1979 | Hauser | 210/219 |
| 4,389,376 | 6/1983 | Kojima | 210/205 |

Primary Examiner—Robert W. Jenkins
Attorney, Agent, or Firm—Sprung, Horn, Kramer & Woods

[57] ABSTRACT

A device for obtaining high-quality mixtures of solids and liquids extending to the colloidal system or to coagulation and employed to treat water or to introduce gases into liquids, wherein the device includes an intermediate tank that has at least one charging aperture at the top, that tapers downward, that the medium flows through in a helical vortex subject to gravity, and that empties into a receiving tank.

15 Claims, 4 Drawing Figures

DEVICE FOR OBTAINING HIGH-QUALITY MIXTURES OF SOLIDS AND LIQUIDS EXTENDING TO THE COLLOIDAL SYSTEM OR TO COAGULATION INTENDED FOR TREATING WATER OR FOR INTRODUCING GASES INTO LIQUIDS

BACKGROUND OF THE INVENTION

Devices equipped with powered propellers, vortex plates, or suspended disks are employed to obtain suspensions and colloidal systems, of hydrosolic colloidates for example. The mixing mechanisms move at high peripheral speeds in order to break up the particles in the mixture subject to high acceleration until the intended system of solids and liquid is obtained. In addition to the high power required for the propellers, vortex plates, or suspended disks, these components are subject to a high level of wear during operation and must accordingly be frequently serviced even though their life is very short.

SUMMARY OF THE INVENTION

The object of the present invention is to provide a device for obtaining high-quality mixtures of solids and liquids extending to the colloidal system or to coagulation that essentially exploits the gravity of the starting mixture to break up the particles in the mixture and in which the starting mixture flows through a tank that is shaped to impose a powerful turbulent flow on it, whereby the device will operate with a low level of wear while being inexpensive to build.

This object is attained in accordance with the invention in that the device includes an intermediate tank that has at least one charging aperture at the top, that tapers downward, that the medium flows through in a helical vortex subject to gravity, and that empties into a receiving tank.

One embodiment has, upstream of the intermediate tank, an intake drum for the medium being treated with a floor with outlet apertures that function as charging apertures.

In another embodiment of the invention the intermediate tank is rotationally symmetrical and has a surface line that is vertically hyperbolic.

The intermediate tank can be constructed out of truncoconicular sections.

The device in accordance with the invention can be employed to treat water or to introduce gases into liquids.

The organic components of the sewage, especially the undissolved components, are split as they flow through the intermediate tank in the helical vortex and partly brought into solution or bonded colloidally in the undissolved state into the volume of sewage with a particle size that is considerably altered.

This is an extremely significant phenomenon, especially with respect to the simplified, aerobic, microbial breakdown of this organic load on the sewage. It is also significant that the microbial processing continues in the subsequent reaction and sedimentation tank and that no considerable percentage of organic components is removed from the organic microbial purification process by precipitating prior to microbial alteration. The purification process is accordingly more complete and occurs strictly aerobically, which eliminates the toxic side effects that have always occurred previously as the result of a partly anaerobic biology.

When the device in accordance with the invention is employed to introduce gases into liquids, the wall of the intermediate tank must have apertures that gases can be innoculated through by pumping or absorption.

Innoculation with liquids and solids is naturally also conceivable.

The state of the art of introducing gases into liquids is extremely unsatisfactory. This is especially true of the field of treating water to purify sewage. The treatment of water involves operations with atomization and cascades, whereas sewage purification involves blowing air or oxygen into compact sewage tanks. A lot of energy is wasted. Even though a great deal of effort has been devoted to the problem of bubble control, there still essentially exists no significant type of plant that produces satisfactory results. This is especially evident from the oxygen-introduction figures for sedimentation tanks, which generally range between 1 and 2 kg/kWh. It must be remembered in this context that no ecological advantage occurs, meaning that the sewage can be purified without the toxic side effects that always result from a lack of oxygen, before 3 kg/kWh. The device in accordance with the invention produces a considerable improvement in the specific introduction figures.

The device in accordance with the invention accordingly carries out functions in the field of sewage purification or waste processing that have not previously been successfully carried out, either separately or in combination, with the results now obtainable. This is especially significant above all when the sewage or other liquid to be purified or contracted is loaded with very high dissolved or undissolved organic materials. Particular examples are leakage water, filtrate water, or disposal water.

To intensify the effects on the starting mixture in order to achieve the colloidal state or coagulation more rapidly, the intermediate tank can be in the form of an inner tank enclosed with an intermediate space by an outer tank that is likewise rotationally symmetrical and has a hyperbolic surface line, with the material withdrawn from an extraction aperture at the bottom of the inner tank mechanically conveyed through the space demarcated by the inner and outer tanks to the charging aperture of the inner tank.

Suctioning, pumping, or propelling equipment that controls the speed of the medium through the inner and outer tanks can be positioned at the bottom of the two containers.

The helical vortex produced as the result of the effect of gravity on the medium and of the particular shape of the inner tank selected will be reinforced by suctional forces generated by the aforesaid mechanical equipment, increasing the rates of turbulence.

The mechanical equipment at the bottom of the inner and outer tanks makes available a number of methods of controlling the flow of the medium through the inner tank and the space between the inner and outer tank. Increasing the speed of the medium flowing through the inner tank will, along with the additional turbulence of the medium, result in a colloided mixture of solids and liquid in an extremely short time.

The medium can also be recirculated to the charging aperture at the top of the inner tank and flow through it again and again until it reaches its intended final state.

The device also make it possible to obtain coagulation. The colloidate can also be de-ionized into an intermediate-aggregate state, meaning that the inner colloidative state will belong to neither the solid, liquid, nor gaseous range or even to any electrical range. This can be designated a prerequisite for conversion of the starting material subsequent to transition through the colloidal phase. Such conversions will occur as multiply as possible, starting with the colloidation point, in relation to either the organic or the inorganic field. Organically, this comes down to a completely different materials formation within the organic materials-forming processes. Inorganically, the result is modified mechanical, physical, and chemical properties. Modification is so extensive that structuring and crystallization, and especially the principles of configuration are completely changed with respect to the starting material.

Some preferred embodiments of the invention will now be described with reference to the attached drawings, wherein

DETAILED DESCRIPTION OF THE PREFERRED EMBODIMENTS

Figure 1:
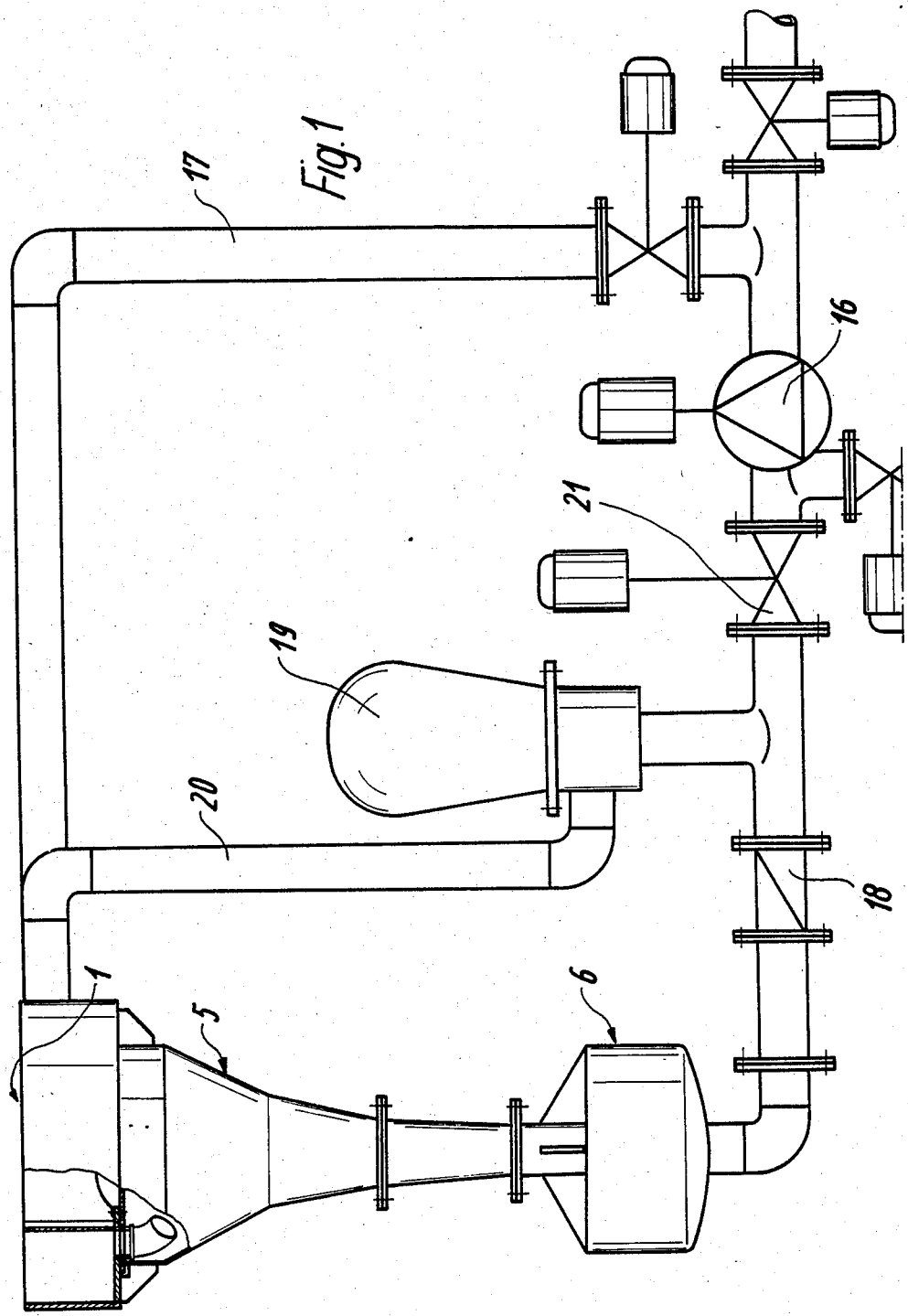
FIG. 1 is an elevation of the device according to the invention.
Figure 2:
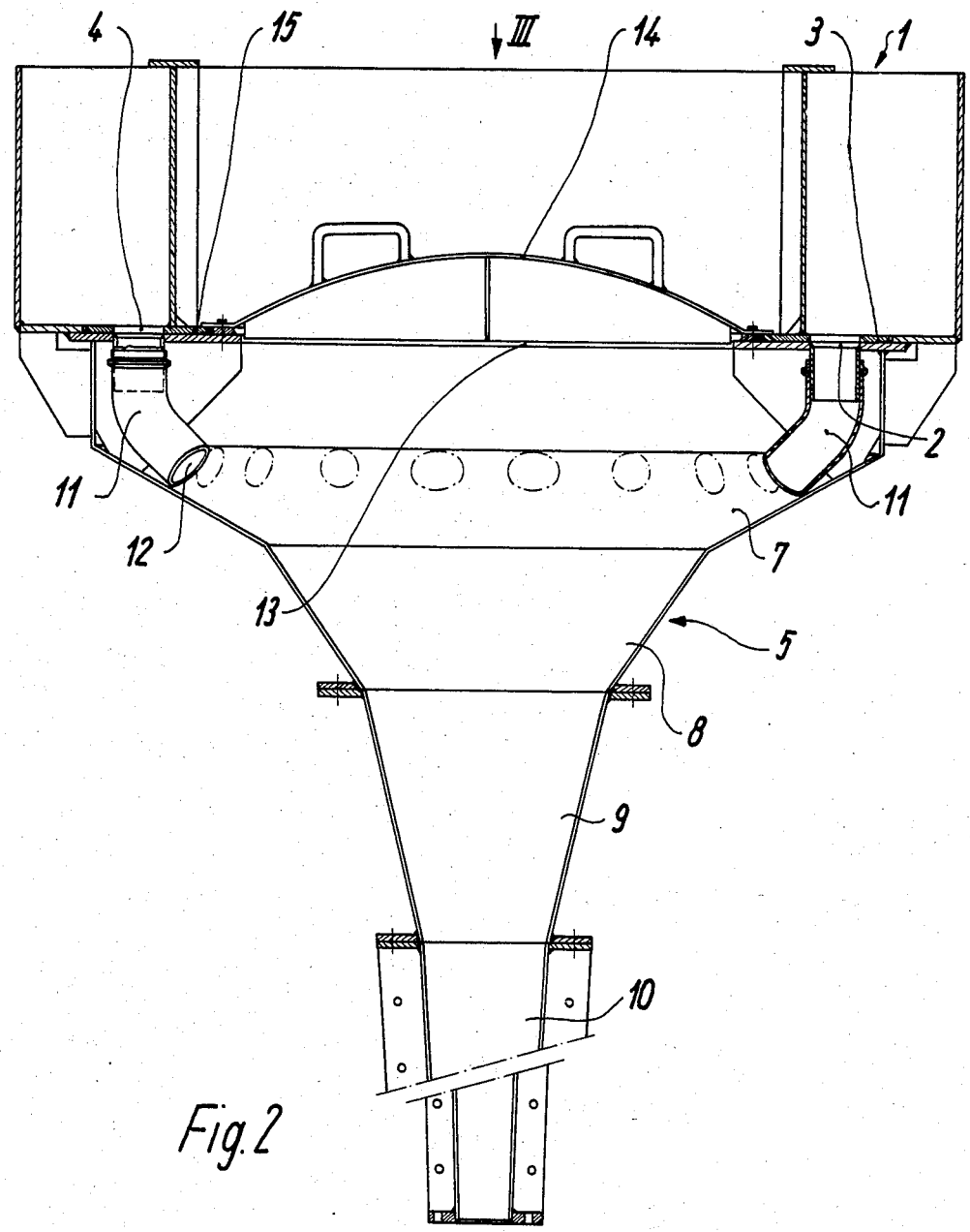
FIG. 2 illustrates the intake drum and communicating intermediate tank with its hyperbolic surface lines.
Figure 3:
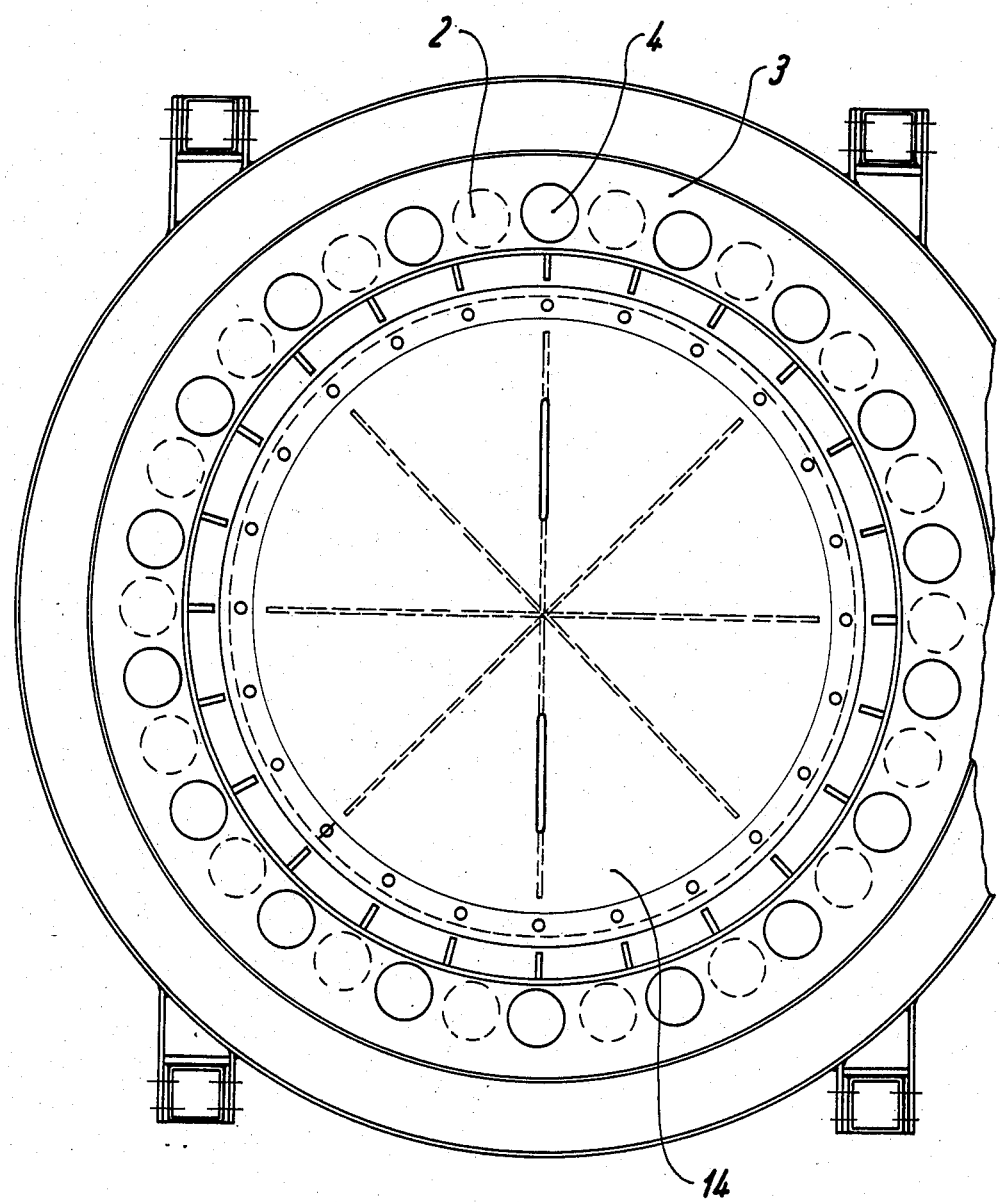
FIG. 3 is a view along the direction indicated by arrow III in FIG. 2.

The device illustrated in FIGS. 1 through 3 has an intake drum 1 for the material being processed. The floor of intake drum 1, which is annular in the embodiment illustrated, has outlet apertures 2 that can be blocked off with a annular slide 3. FIG. 3 illustrates annular slide 3, which has flowthrough apertures 4 distributed uniformly around its circumference, in the closure position. Flowthrough apertures 4 can, as illustrated in FIG. 2, be brought into alignment with outlet apertures 2.

Communicating with intake drum 1 is an intermediate tank 5 that tapers downward. Intermediate tank 5 empties at the bottom into a receiving tank 6 with a capacity that at least equals that of intake drum 1. Intake drum 1, intermediate tank 5, and receiving tank 6 have a common vertical central axis.

Intermediate tank 5 is rotationally symmetrical and has a preferably vertically hyperbolic surface line.

As will be evident from the drawings, intermediate tank 5 is built up out of mutually liquid- and gas-tight truncoconicaly sections 7, 8, 9, and 10. Since the joints between intake drum 1 and intermediate tank 5 and between intermediate tank 5 and receiving tank 6 are also liquid- and gas-tight, it is also possible to generate a partial vacuum in intermediate tank 5 by means of a vacuum pump.

Outlet apertures 2 are in the vicinity of the outer edge of intermediate tank 5. With outlet apertures 2 are associated elbow connections 11 with bottom outlets 12 in the vicinity of the interior surface of the downward-tapering intermediate tank 5. The outlet apertures 2 at the bottom of intake drum 1 can be sealed off liquid- and gas-tight by means of annular slide 3.

Intermediate tank 5 has at the top a central opening 13 that can be closed with a cover 14. Opening 13 is demarcated by an outer ring 15 that is attached to the outer surface of intermediate tank 5 and that has the outlet apertures 2.

When a colloidal system of solids and liquid is to be obtained, the starting materials are premixed in a tank, not illustrated, equipped with an agitator. The material is transferred by means of a pump 16 from this premixing tank into intake drum 1 through a pipeline 17. The premixed medium can also be loaded by hand into intake drum 1. Annular slide 3 is kept in the closure position while intake drum 1 is being charged. The slide is then brought into its open position, whereupon the mixture of solids and liquid will flow through elbow connections 11 and arrive in the intermediate tank 5 with preferably hyperbolically shaped walls, through which it flows in a helical vortex, breaking up the solids. The mixture of solids and liquid then flows from intermediate tank 5 into receiving tank 6.

The shape of the interior of intermediate tank 5, which tapers down from intake drum 1 is essential to generate the turbulent flow in the tank. Optimal flow conditions will be obtained in an intermediate tank 5 with walls having a hyperbolic shaped vertical surface.

Basically, the dimensions are derived from the formula for the turbulence. The lines of the material flowing through essentially follow the lines of a hyperbolic worm.

The overall height and other dimensions depend on the particular purpose. In large sedimentation plants, for example, the intermediate tank will have an overall height of 10 meters. When the device is employed in domestic sedimentation plants or on construction sites to obtain a mixture of cement and water, overall heights of 1 meter ought to be adequate for the intermediate tank.

The interior surface of the intermediate tank can be smooth. Guide rails or other guides can, however, also be positioned on the interior surface of the tank to reinforce the helical lines of circulation of the material flowing through it.

The intermediate tank can also be charged with tower packing or impact packing. This is significant for many types of media from the aspect of oxygen absorption, gas exchange, or the dissolution of gas in liquids.

The intake drum can communicate directly with the lower end of the intermediate tank. It is, however, also conceivable to provide still another pipeline between the receiving tank and the intake drum, in which case the line must be dimensioned to prevent clogging with material.

In some cases the material being treated will have to flow through the intermediate tank only once.

In other cases the material, the mixture of solids and liquid for example, must flow through the intermediate tank several times in order to obtain the desired mixture system.

The device illustrated in FIG. 1 is designed to allow the medium being treated to flow through the intermediate tank several times. Once it has flowed through intermediate tank 5, it plunges into receiving tank 6. The resulting energy of impact can be supplied through an appropriate excess-pressure valve 18 to an accumulator 19 that operates on the principle of a water hammer (on a ram) and is equipped with an air dome. The supplemental pressure stored in the air dome as a result of the impact energy of the medium can be exploited to recirculate the medium to intake drum 1 through a line 20. A gate valve 21 will be closed while the medium is being recirculated.

The intermediate tank 5 employed in a test plant had a maximal radius of 200 mm and, diminishing at a ratio of 1:9, an overall height of 1.80 m. The intake drum 1 had an overall height of 200 mm and a capacity of 60 liters. The capacity of receiving tank 6 equalled that of the intake drum 1.

EXAMPLE 1

60 kg of cement were added to 30 l of water. The material was premixed in a conventional mixer and conveyed through a pump into the intake drum with its annular slide closed. A partial vacuum of 0.5 bars was generated in intermediate tank 5 and annular slide 3 opened. The flow of material in the intermediate tank, which was made out of plastic, could be observed. The material plunged downward in helical vortices. At the bottom fourth of the intermediate tank it was evident that the surface of the vortex was almost horizontal and the lines of the vortex were extremely close together, so that the path through the thickest part of the vortex was very long, corresponding to increasing speed. The material was captured in receiving tank 6 and recirculated back into the intake drum at the top. The mixture exhibited a tendency to emulsify after passing through only once. Subsequent to the third passage, the viscosity had increased to such an extent that the transition from an emulsion to a colloidal system could already be confirmed.

EXAMPLE 2

Subsequent to generating the partial vacuum of 0.5 bars, the mixture of 60 l of water and cement in the intake drum was introduced into the intermediate tank by opening the annular slide. Once the precipitation level of the materials had attained 3/5 of the height of plunge in the intermediate tank, the annular slide was closed again. Inertia forced the material to continue its plunge, although an increased partial vacuum simultaneously developed in the space at the top of the intermediate tank. The precipitation level of the material came to rest at 10 to 15 cm above the intake into receiving tank 6 and the material was conveyed up again at high speed. Appropriate adjustment of the annular slide and the partial vacuum produced an extremely intense back-and-forth oscillation in the material. The mixing action was correspondingly powerful. A colloidal system was obtained with the mixtures of water and cement subsequent to three to five oscillation processes.

EXAMPLE 3

Diluted sewage sludges with a biological oxygen demand of 850 was introduced into the intake drum and intermediate tank. No partial pressure was generated in the intermediate tank. With the outlets open and cover 14 removed, 60 to 80 l was introduced. It was evident in this case that enough must be introduced and the speed in the intake drum be high enough to initially form a banked-up level. The volume can then be reduced until the banked-up level turns into a suction-drain vortex. The level that is sufficient to maintain the suction-drain vortex will then determine the outlets to be left open by the annular slide during long-term operation. At normal gravity this results in an infeed effect that is in itself very interesting and that, as measured by the results of oxygen introduction, permits the 10-kg mark in terms of energy employed, in kWh that is, to be attained.

EXAMPLE 4

Three air valves were positioned at the upper section of the intermediate tank. A partial vacuum of 0.5 bars was generated in the intermediate tank. The sewage sludge in the intake drum was then introduced into the intermediate tank by opening the annular slide. The three air valves were opened once turbulent flow had been established. Specific oxygen introduction increased only slightly, up to the 12-kg/kWh mark. It was, however, evident that the device's output had not been exhausted and that its capacity can be considerably increased by generating a partial vacuum. As much as 160 l could be processed at the same time, instead of 80.

Figure 4:
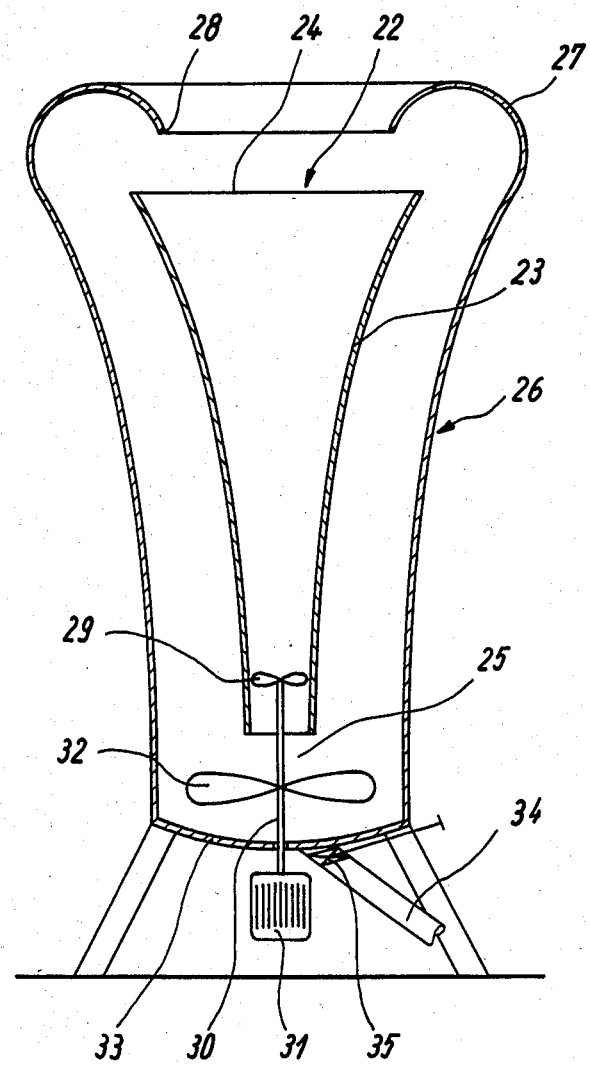
FIG. 4 illustrates another embodiment according to the invention.

The device illustrated in FIG. 4 has an inner tank 22 that is rotationally symmetrical and has a hyperbolic cross-section shaped wall 23. Inner tank 22 has a charging aperture 24 at the top and an extraction aperture 25 at the bottom. It is surrounded by an outer tank 26, with the distance between the outside surface of inner tank 22 and the inside surface of outer tank 26 being constant all the way around and over the total height of the inner tank. Outer tank 26 is accordingly also rotationally symmetrical and has a hyperbolic surface line. Outer tank 26 also has a diversion component 27 at the top that extends transversely over the height of a charging aperture 24 and has a curved cross-section. The free space 28 inside diversion component 27 is positioned above charging aperture 24. The curved contour of diversion component 27 diverts the material conveyed upward in the annular space between inner tank 22 and outer tank 26, preventing it from spattering off the inside surface of the outer tank and guiding it uniformly into charging aperture 24.

A propeller 29 is mounted on a driveshaft 30 at the bottom of wall 23. Propeller 29 is powered by a motor 31. In the embodiment illustrated, another propeller 32, with a diameter that is essentially longer than that of propeller 29 and with blades that are set at a different angle of attack, is also mounted on driveshaft 30. Propeller 29 draws down the mixture of solids and liquid that has been introduced into inner tank 22 and that is flowing through it in helical vortices and forces the mixture through an extraction aperture 25. The material is accordingly being subjected to both centripetal and centrifugal forces.

The propellers can also have separate drive mechanisms and operate in opposite senses.

The processed material can in the final phase be stabilized subject solely to the effect of the centripetal forces by simply passing through the inner tank subsequent to colloidization. It can accordingly emerge both colloided and dynamized.

A discharge pipe 34 that contains a blocking gate 35 in the vicinity of the floor 33 of outer tank 26 and that extends out from the floor is provided for this purpose.

Any type of liquid can be processed in this device. Of special significance are methods of carrying out metabolism-like processes to improve quality or modify materials in the fields of water, sewage, sludge, pollution, minerals, blood lavage, dialysis, etc.

Guide rails or braking barriers for the flowing medium can be positioned in the space between inner tank 22 and outer tank 26.

It will be appreciated that the instant specification and claims are set forth by way of illustration and not limitation, and that various modifications and changes may be made without departing from the spirit and scope of the present invention.

What is claimed is:

1. In a device for obtaining high-quality mixtures of solids and liquids extending to the colloidal system or to coagulation and employed to treat water or to introduce gases into liquids and having intake means and receiving means the improvement comprising an intermediate tank between the intake means and the receiving means and having at least one charging aperture at the top thereof and which tapers downwardly to effect a flow of a medium therethrough in a helical vortex subject to a gravity, and which empties into the receiving means, wherein the intake means comprises an annular intake drum upstream of the intermediate tank and having a floor with outlet apertures in the vicinity of the outer edge of the intermediate tank and that function as the charging apertures, wherein the receiving means comprises a receiving tank and wherein the intake drum, the intermediate tank, and the receiving tank have a common vertical central axis and further comprising an annular slide for blocking off the outlet apertures and elbow connections with bottom outlets in the vicinity of the interior surface of the downward-tapering intermediate tank and connected with the outlet apertures.

2. The device as in claim 1, wherein the intermediate tank is rotationally symmetrical and has a vertical surface with a hyperbolic cross section.

3. The device as in claim 2, wherein the intermediate tank comprises an inner tank enclosed with an intermediate space by an outer tank, the inner and outer tanks being rotationally symmetrical and having a surface with a hyperbolic cross section, means for mechanically conveying material withdrawn from an extraction aperture at the bottom of the inner tank through the space demarcated by the inner and outer tanks to the charging aperture of the inner tank.

4. The device as in claim 3, wherein the distance between the outside surface of the inner tank and the inside surface of the outer tank is constant all the way around and over the total height of the inner tank and the outer tank has a diversion component at the top that extends transversely over the height of a charging aperture.

5. The device as in claim 3, wherein the conveying means control the speed of the medium in the inner and outer tanks and is positioned at the bottom of the tanks.

6. The device as in claim 5, wherein the conveying means comprises powered propellers, one at the bottom of the inner tank and another at the bottom of the outer tank, that convey the medium out of the inner tank and back through the outer tank into the charging aperture of the inner tank.

7. The device as in claim 6, wherein the blades of the propellers have different angles of attack, both are mounted on a common vertical driveshaft, and the bottom propeller, which is positioned in the outer tank, has a longer diameter than the other propeller, which is positioned in the inner tank.

8. The device as in claim 1, wherein the intermediate tank is constructed out of truncoconical sections.

9. The device as in claim 1, wherein the intermediate tank has a central opening at the top and a cover for closing same, an outer ring attached to the outer surface of intermediate tank to demarcate the central opening and having the outlet apertures therein.

10. The device as in claim 1, wherein the intake drum and receiving tank are connected liquid- and gas-tight to the intermediate tank.

11. The device as in claim 10, further comprising an annular slide for liquid and gas tightly sealing the outlet apertures at the bottom of the intake drum.

12. The device as in claim 1, wherein the wall of the intermediate tank has apertures that gases, granular solids, or liquids can be introduced through.

13. In a method for obtaining high-quality mixtures of solids and liquids extending to the colloidal system or to coagulation and employed to treat water or to introduce gases into liquids, the improvement comprising feeding a mixture to an annular intake drum having a floor with outlet apertures and thereafter into an intermediate tank between the intake drum and a receiving tank which tapers downwardly, to effect a flow therethrough in a helical vortex subject to gravity, and that empties into the receiving tank, the intake drum, intermediate tank and receiving tank having a common vertical extend axis, after the mixture of solids and liquid has been added to the intake drum and before the outlet apertures have been opened, generating a partial vacuum in the intermediate tank thereafter opening the outlet apertures so that material flows through the intermediate tank in a helical vortex into the receiving tank, repeating the steps several times until the colloidal system or the coagulated substance is attained as a result of breakup of and action on the solid particles.

14. The method as in claim 13, wherein after addition of the mixture to the intake drum, a partial vacuum is generated in intermediate tank, the outlet apertures are opened, and, once the level of the medium in the intermediate tank has attained a certain fall height, closing the outlet apertures so that the mixture subsequently flows back subject to vacuum.

15. The method as in claim 14, wherein an oscillating back-and-forth motion of the mixture is generated in the intermediate tank by control of the partial vacuum and of an annular slide opening and closing the outlet apertures.

* * * * *